(12) United States Patent
Vogeler

(10) Patent No.: US 11,395,481 B1
(45) Date of Patent: Jul. 26, 2022

(54) HAND-HELD DEVICE FOR POWERING THE REWINDING OF A FISHING REEL

(71) Applicant: Craig A. Vogeler, North Loup, NE (US)

(72) Inventor: Craig A. Vogeler, North Loup, NE (US)

( * ) Notice: Subject to any disclaimer, the term of this patent is extended or adjusted under 35 U.S.C. 154(b) by 0 days.

(21) Appl. No.: 17/188,516

(22) Filed: Mar. 1, 2021

(51) Int. Cl.
*A01K 89/01* (2006.01)
*A01K 89/017* (2006.01)
*A01K 89/015* (2006.01)

(52) U.S. Cl.
CPC ...... *A01K 89/017* (2013.01); *A01K 89/01928* (2015.05)

(58) Field of Classification Search
CPC ... A01K 89/017; A01K 97/00; B65H 75/4486
See application file for complete search history.

(56) References Cited

U.S. PATENT DOCUMENTS

| | | | |
|---|---|---|---|
| 2,190,398 A | 2/1940 | Bugatti | |
| 2,409,098 A | 10/1946 | Benson | |
| 2,760,736 A * | 8/1956 | Mihalko | A01K 89/017 242/270 |
| 3,077,318 A * | 2/1963 | Du Val | A01K 89/017 242/250 |
| 3,126,166 A * | 3/1964 | Weinberg | G05G 1/085 74/545 |
| 3,874,610 A * | 4/1975 | Wahlberg | A01K 89/028 242/225 |
| 4,021,003 A * | 5/1977 | Watkins | A01K 89/017 242/270 |
| 5,004,181 A | 4/1991 | Fowles | |
| 5,088,657 A * | 2/1992 | Chen | A01K 89/006 242/225 |
| 5,947,790 A * | 9/1999 | Gordon | B65H 75/4486 242/390.8 |
| 6,012,665 A * | 1/2000 | Olona | A01K 89/0122 242/305 |
| 6,056,219 A * | 5/2000 | Barkley | A01K 89/006 74/625 |
| 6,126,104 A * | 10/2000 | Kellerman | A01K 89/012 242/225 |
| 6,685,125 B1 * | 2/2004 | Tucci | A01K 89/017 242/390.8 |
| 6,896,216 B2 | 5/2005 | Chiba | |
| 7,086,622 B1 * | 8/2006 | Whaley | A01K 89/017 242/250 |
| 7,175,120 B2 | 2/2007 | Ono | |

(Continued)

*Primary Examiner* — Emmanuel M Marcelo
(74) *Attorney, Agent, or Firm* — Suiter Swantz pc llo

(57) ABSTRACT

A hand-held device for powering the rewinding of a fishing reel which includes a housing having an interior compartment. The spool support shaft of the fishing reel has a gear mounted thereon after the crank handle thereof has been removed. A rechargeable DC battery is mounted in the interior compartment. A DC motor is positioned in the interior compartment and is electrically operated by the DC battery. The DC motor has a drive shaft which is rotatable in a single direction. The drive shaft has a gear mounted thereon. The gear on the spool support shaft may be connected to the gear on the drive shaft of the motor whereby the spool may be rotated to rewind the fishing line onto the spool.

9 Claims, 7 Drawing Sheets

(56) References Cited

U.S. PATENT DOCUMENTS

| | | | |
|---|---|---|---|
| 7,309,039 B1 * | 12/2007 | Stone | A01K 89/017 242/225 |
| 7,334,749 B2 | 2/2008 | Terauchi et al. | |
| 7,793,877 B2 * | 9/2010 | Ogino | A01K 89/017 242/225 |
| 7,946,076 B2 * | 5/2011 | Gascoigne | A01K 97/01 43/4.5 |
| 8,047,461 B1 * | 11/2011 | Slawson | A01K 89/003 242/227 |
| 8,579,222 B1 * | 11/2013 | Alvarez | A01K 89/017 242/227 |
| 8,844,854 B2 | 9/2014 | Jyo et al. | |
| 9,392,779 B1 * | 7/2016 | Dahlberg | A01K 97/01 |
| 10,058,083 B2 | 8/2018 | Nonogaki | |
| 10,779,523 B2 * | 9/2020 | DeFreitas | A01K 89/012 |
| 2003/0168546 A1 * | 9/2003 | Bankston | A01K 89/003 242/390.8 |
| 2006/0076444 A1 * | 4/2006 | Westhoff | A01K 87/007 242/225 |
| 2008/0191084 A1 * | 8/2008 | Prats | B65H 75/4486 242/390.8 |

\* cited by examiner

HAND-HELD DEVICE FOR POWERING THE REWINDING OF A FISHING REEL

BACKGROUND OF THE INVENTION

Field of the Invention

This invention relates to a hand-held DC battery operated device which may be selectively removably attached to a conventional fishing reel for power rewinding the fishing line onto the fishing reel.

Description of the Related Art

Many types of electric-powered fishing reels have been previously provided. However, most of the prior art electric-powered fishing reels are expensive factory installed electric-powered reels which may cost several hundreds of dollars. Further, the electric-powered reels of the prior art can only be used on the fishing rod having the electric-powered reel factory installed.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A hand-held DC battery operated device for attachment to a conventional fishing reel without much modification of the fishing reel for power rewinding the fishing line onto the spool of the reel after the fishing line has been extended from the fishing reel spool during a casting operation or the like.

The device of this invention is housed in a hand-held generally rectangular-shaped housing having an interior compartment. A rechargeable DC battery is positioned in the interior compartment of the housing. A DC motor is also positioned in the interior compartment of the housing and is electrically connected to the DC battery. The DC motor includes a rotatable drive shaft which extends from the DC motor and which is rotatable in a single direction.

A gear is mounted on the drive shaft of the DC electric motor. The gear on the electric motor drive shaft is positioned inwardly of a circular opening formed in the inner side of the housing. The crank handle of the fishing reel is removed from the outer end of the spool support shaft. A gear is mounted on the outer end of the spool support shaft. When the device of this invention is positioned at the side of the fishing reel, the gear on the outer end of the spool support shaft extends through the opening in the side of the housing and is in mesh with the gear on the electric motor drive shaft. Thus, when the electric motor is activated, the spool of the reel is rotated so that the fishing line is power rewound onto the spool of the reel.

The device of this invention may be used with any fishing reel which has a spool support shaft or center shaft.

A principal object of the invention is to provide a hand-held device for powering a fishing reel.

A further object of the invention is to provide a hand-held device of the type described which may be easily attached to one end of the spool support shaft of the fishing reel without much modification of the fishing reel or support shaft.

Yet another object of the invention is to provide a hand-held device of the type described which includes a DC electric motor driven by a rechargeable battery.

Still another object of the invention is to provide a hand-held device of the type described which is easily attached to and disconnected from the spool support shaft of different types of fishing reels.

Still another object of the invention is to provide a hand-held device of the type described which does not interfere with the normal usage of the fishing reel.

Still another object of the invention is to provide a hand-held device of the type described which is economical of manufacture and durable in use.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
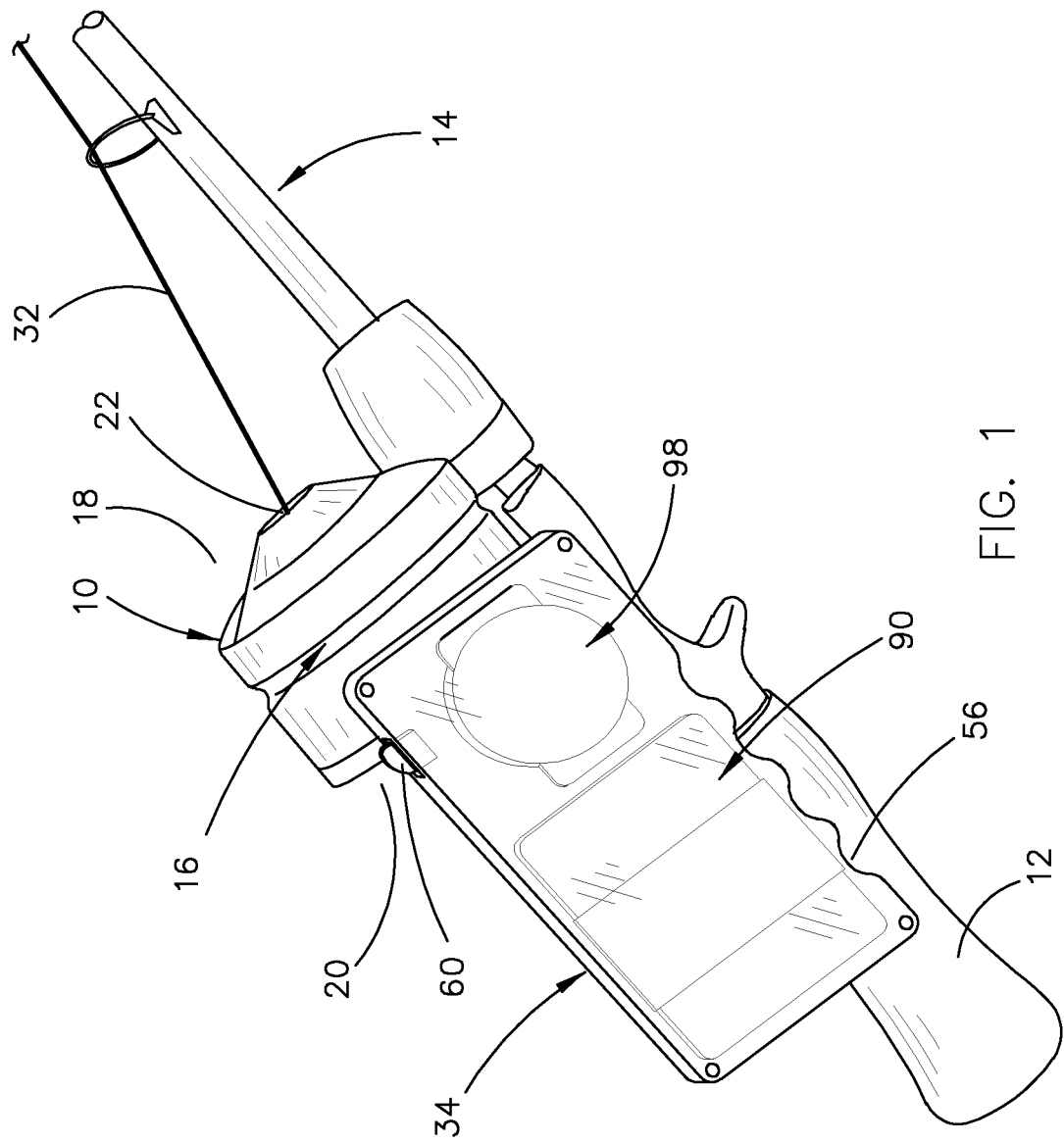
FIG. 1 is a perspective view illustrating the device of this invention secured to the fishing reel of a fishing rod.
Figure 2:
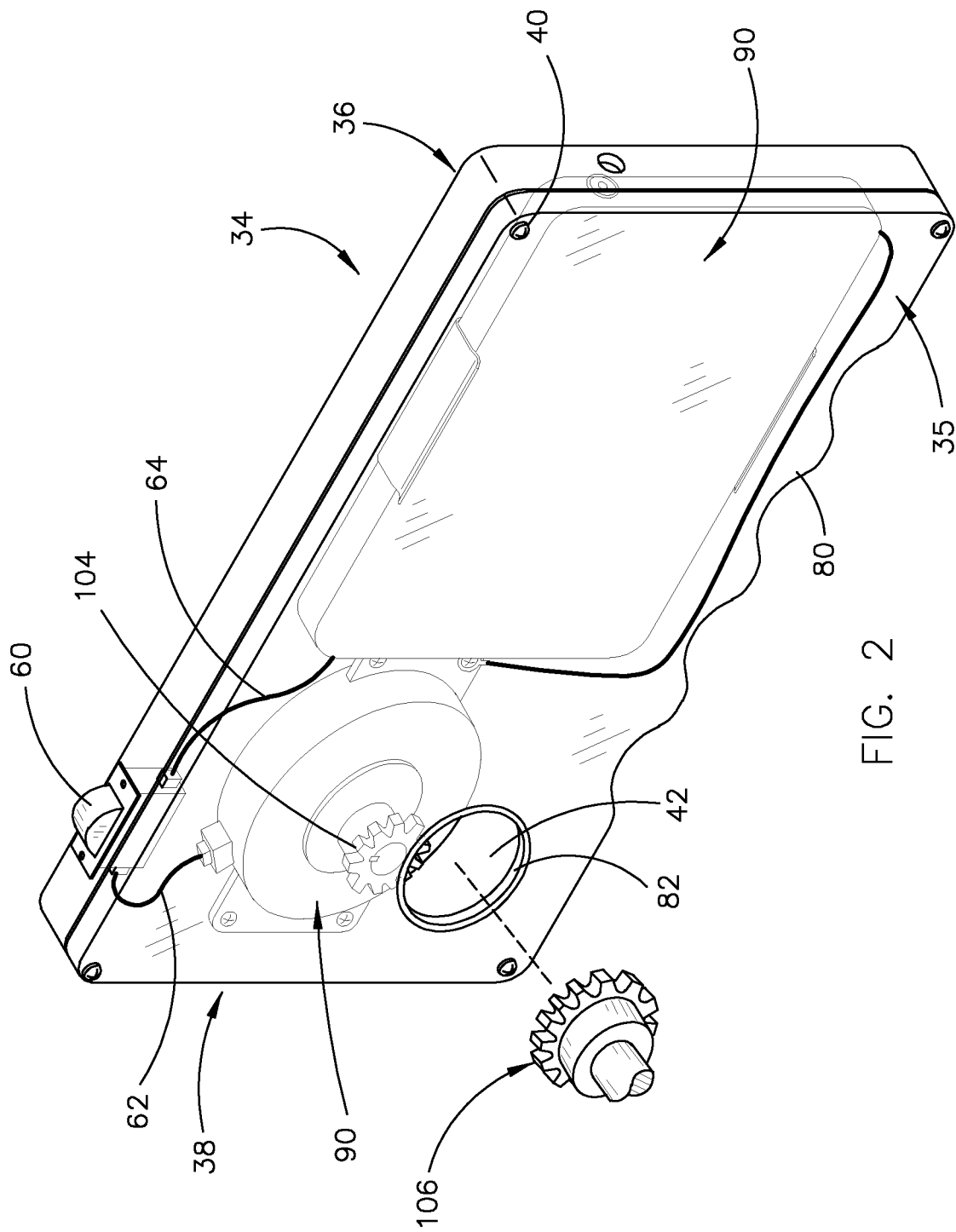
FIG. 2 is a partial exploded perspective view of the device of this invention and which also shows the gear which is attached to the outer end of the spool support shaft of the fishing reel.
Figure 3:
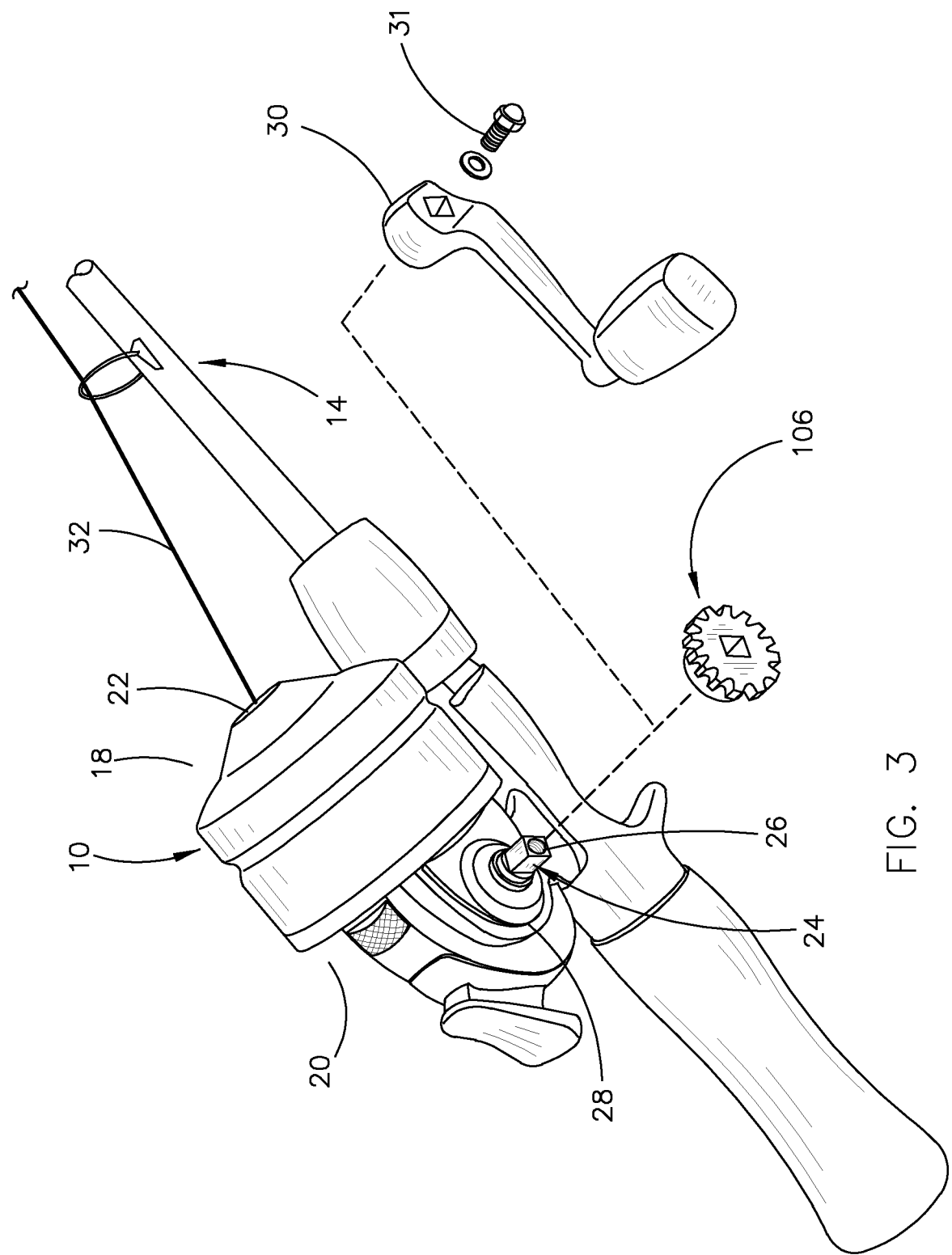
FIG. 3 is a partial exploded perspective view of the fishing rod of FIG. 1 wherein the crank handle of the fishing reel has been removed from the fishing reel and wherein a gear is shown which will be attached to the spool support shaft of the fishing reel.
Figure 4:
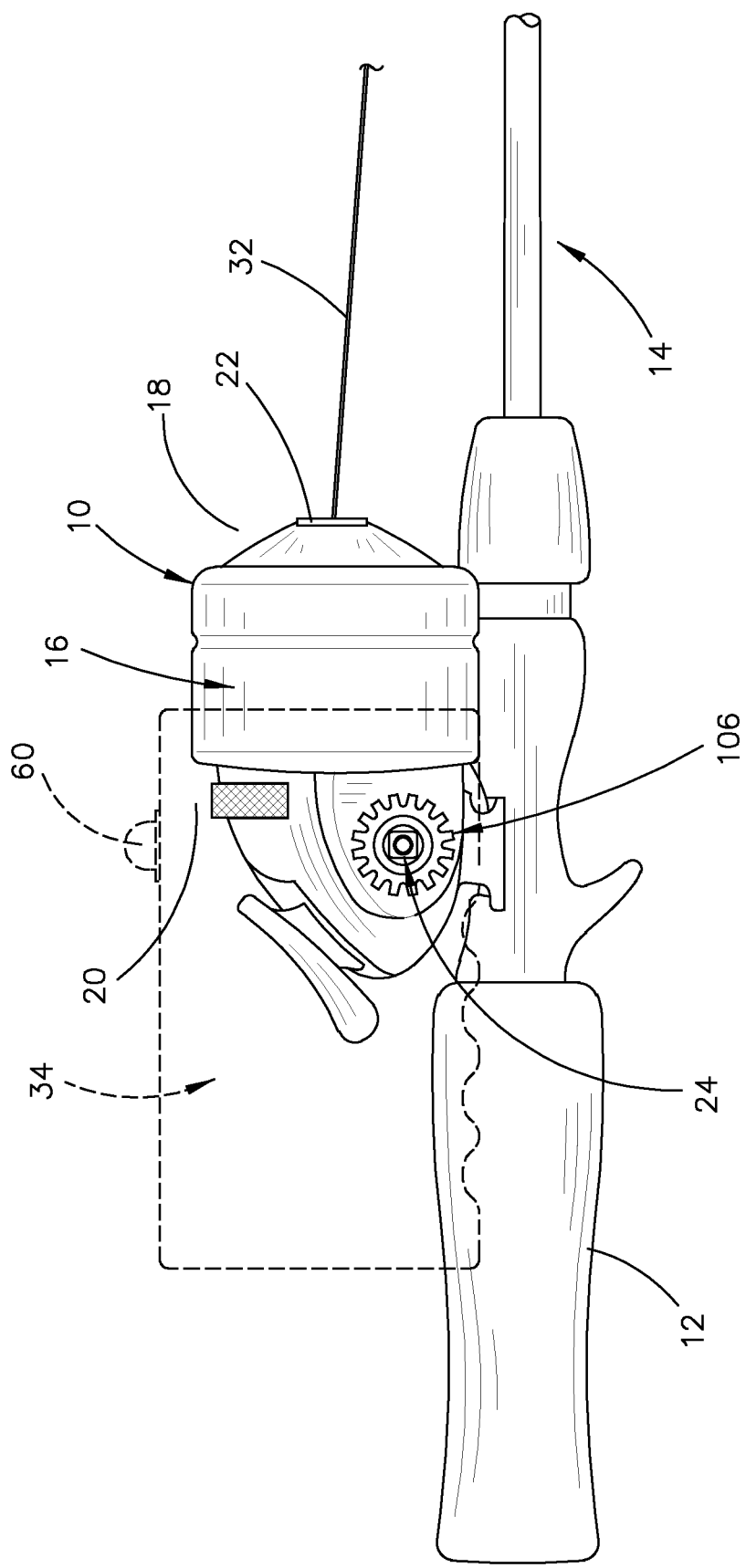
FIG. 4 is a partial side view which illustrates the gear which is attached to the spool support shaft with the device of this invention being partially shown in broken lines.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional bait casting reel which is mounted on the handle 12 of a fishing rod 14 in conventional fashion. Reel 10 includes a reel body 16 having a forward end 18 and a rearward end 20. The forward end 18 of reel body 16 has a fishing line opening 22 formed therein.

An elongated spool support shaft 24, sometimes referred to as a center shaft, is rotatably mounted in reel body 16 in conventional fashion with end 26 of spool support shaft 24 protruding outwardly from side 28 of reel body 16. A crank handle 30 is normally secured to the end 26 of spool support shaft 24 by screw 31 whereby rotation of the crank handle 30 causes rotation of spool support shaft 24. A conventional spool 25 is mounted on spool support shaft 24 whereby rotation of crank handle 30 will cause rotation of the spool 25 in conventional fashion.

A conventional clutch or bail (not shown) is provided whereby the spool 25 may freely rotate in the casting mode without spool support shaft 24 or crank handle 30 being rotated. Fishing line 32 is wound on the spool 25 in conventional fashion.

The forgoing describes a conventional reel 10 which may take many shapes and forms. Applicant's instant invention is designed to be attached to the spool support shaft of any type of fishing reel which has a spool support shaft or center shaft 24 associated therewith.

Applicant's device for rewinding the fishing line 32 onto the spool 25 of the reel 10 will now be described. The device of this invention is designated by the reference numeral 34. Device 34 includes a housing 35 which includes housing members 36 and 38. Housing members 36 and 38 are shown to be transparent but could be non-transparent if so desired. Housing member 38 is secured to housing member 36 by screws 40. When housing member 38 is secured to housing member 36, an interior compartment 42 is created therebetween. For purposes of description, housing member 36 will be described as including a first end 44, a second end 46, an upper end 38, a lower end 50, an outer side 52 and an inner side 54. The lower end 50 of housing member 36 has four finger receiving grooves or indentations 56 formed therein. The upper end 48 of housing member 36 has an opening 58 formed therein which has a switch 60 positioned therein with leads 62 and 64 extending therefrom. End 44 of housing member 36 has an opening 66 formed therein.

Housing member 38 includes a first end 68, a second end 70, an upper end 72, a lower end 74, an outer side 76 and an inner side 78. The lower end 74 of housing member 38 has four finger receiving grooves or indentations 80 formed therein which are aligned with the four grooves or indentations 56 of housing member 36. Housing member 38 has a circular opening 82 formed therein.

The numeral 86 refers to a battery holder which is secured to the inner side 54 of housing member 36 by screws 88. A rechargeable DC battery 90 is mounted in battery holder 86 and has a lead 92 extending therefrom. Battery 90 has a recharge outlet 94 for receiving the recharge cord or lead 96 which extends through opening 66 in housing member 36.

Figure 5:
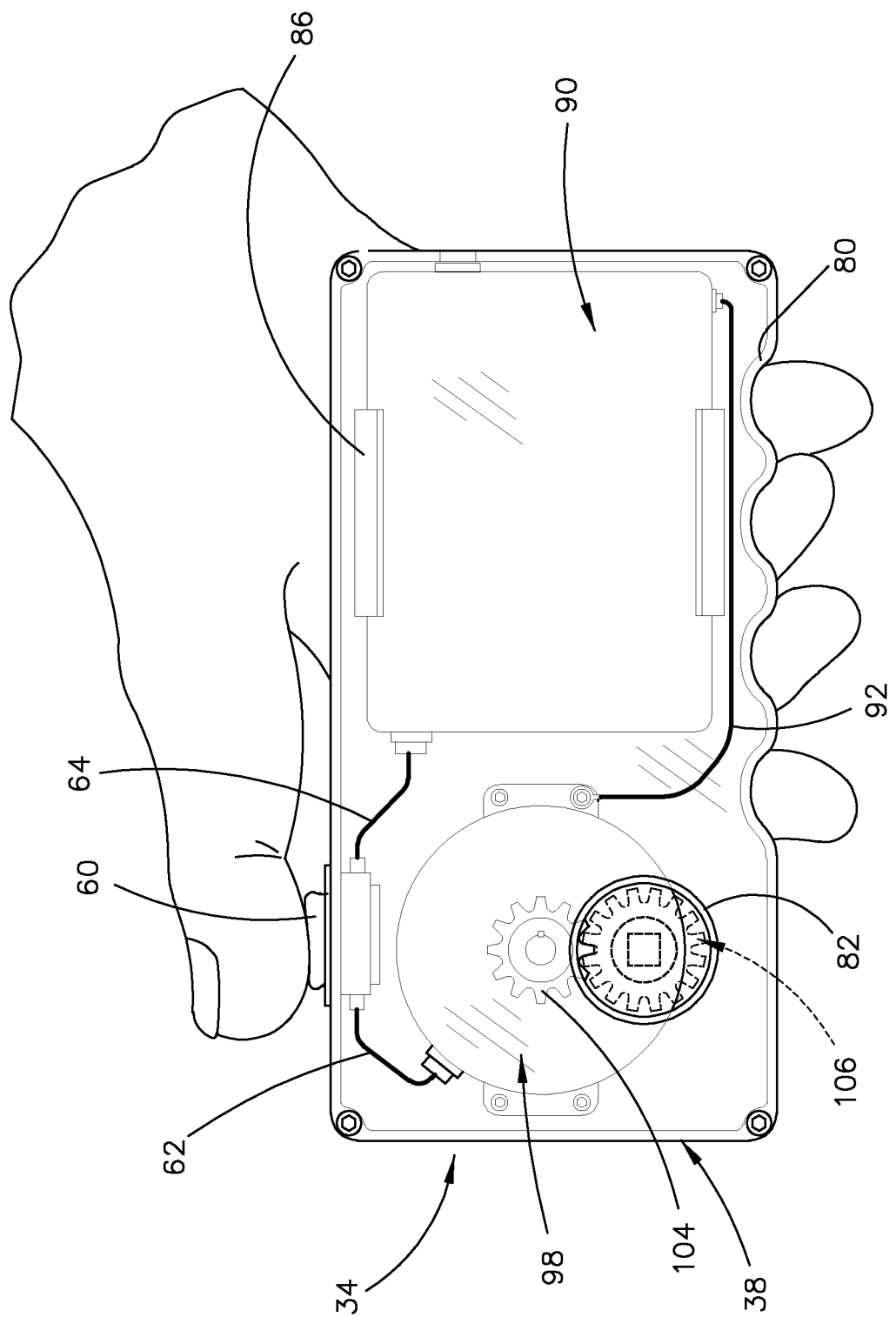
FIG. 5 is a side view of the device of this invention and which illustrates the gear, in broken lines, which is attached to the spool drive shaft and which is in mesh with the gear mounted on the drive shaft of the electric motor of the device of this invention.
Figure 6:
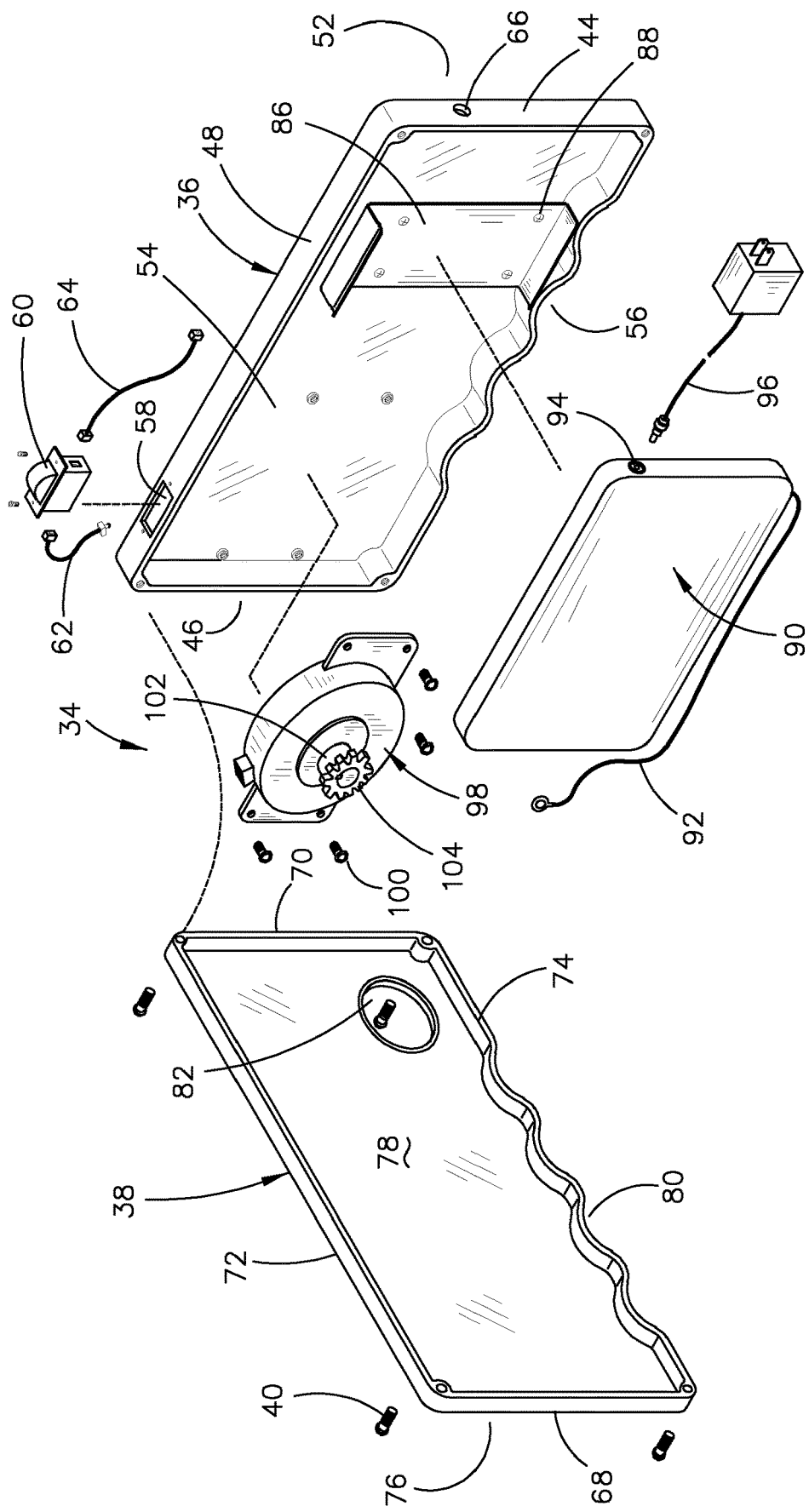
FIG. 6 is an exploded perspective view of the device of this invention.
Figure 7:
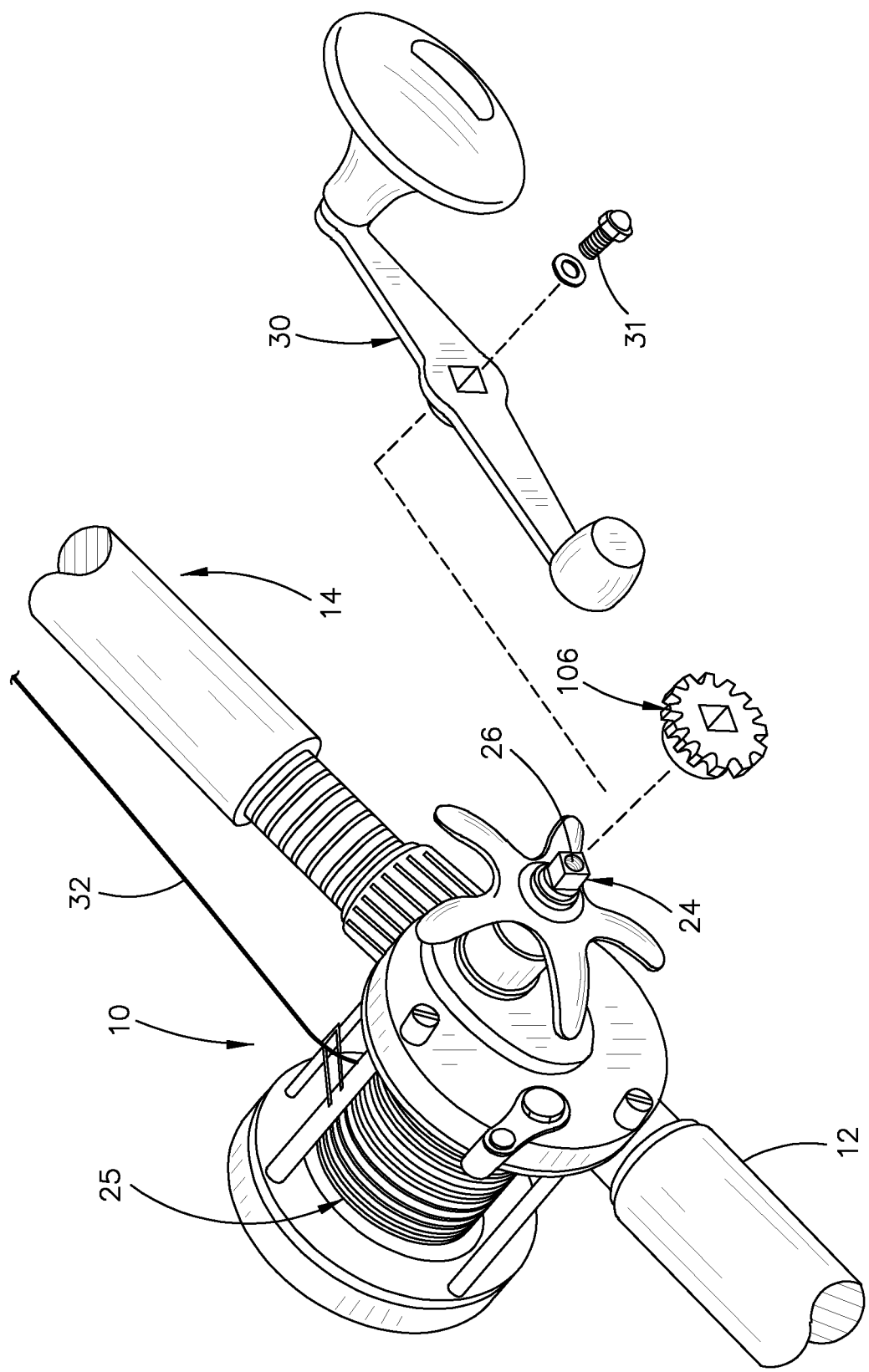
FIG. 7 is a perspective view of a different type of fishing rod and reel and which shows the crank handle removed from the spool support shaft and which illustrates the gear which will be mounted on the end of the spool support shaft.

A DC motor 98 is secured to the inner side 54 of housing member 36 by screws 100. Motor 98 has a rotatable drive shaft 102 extending therefrom which has a gear or sprocket 104 mounted thereon for rotation therewith. Motor 98 is electrically connected to lead 62 which is connected to switch 66. Motor 98 is electrically connected to battery 90 by lead 92. Lead 64 extends from switch 60 to battery 90. Motor 98 is electrically connected to battery 90 by lead 92 as also seen in FIG. 5. The housing members 36 and 38 are preferably comprised of a plastic material.

The device 34 is used as follows. First, the crank handle 30 is disconnected from the reel 10 by removing the screw 31 from crank handle 30 at the end 26 of shaft 24. A sprocket or gear 106 is then secured to the end 26 of shaft 24. The device 34 is then positioned at the side of the reel 10 so that opening 82 of device 34 receives gear 106. When the gear 106 is completely received in the opening 82, the gear 106 will mesh with gear 104.

When it is desired to rewind the fishing line 32 onto the spool of the reel 10, switch 60 is depressed which activates motor 98 which causes gear 104 to be rotated in a single direction which causes gear 106 and shaft 24 to be rotated. The rotation of gear 106 and shaft 24 causes the fishing line 22 to be rewound on the spool of the reel 16 thereby bringing the bait on the hook of the fishing line 32 and any fish therein to be brought to the outer end of the fishing rod 14 without any work on the part of the fisherman or fisherwoman.

The device 34 is attached to the reel 10 without a minimum of modification of the reel 10 being required. The device may be attached to the reel 10 very easily and removed therefrom very easily. The device 34 may be used on other reels owned by the fisherperson. Further, the device 34 may be used on different types of reels.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination:
   a fishing reel including an elongated and selectively rotatable spool support shaft having first and second ends;
   said spool support shaft having a spool mounted thereon which has a fishing line wound thereon;
   said spool being mounted on said spool shaft so that rotation of said spool shaft in a first direction causes said spool to be rotated in a fishing line rewind direction and whereby said spool may freely rotate with respect to said spool shaft in a fishing line casting direction;
   a power unit including:
   (a) a hand-held portable housing having an interior compartment;
   (b) a rechargeable DC battery positioned in said interior compartment of said housing;
   (c) a DC electric motor positioned in said interior compartment of said housing;
   (d) said DC electric motor being electrically connected to said battery;
   (e) said DC electric motor having a rotatable drive shaft extending therefrom which is rotatable in a single direction by said DC electric motor;
   (f) said housing including a manually operated switch which is electrically connected to said DC battery for controlling said DC electric motor; and
   said rotatable drive shaft of said DC electric motor being selectively removably connected to said first end of said spool support shaft for rotating said spool support shaft to power rewind said fishing line onto said spool after said fishing line has been unwound from said spool, wherein said first end of said spool support shaft has a gear fixed thereto rather than a crank and wherein said drive shaft has a gear fixed thereto for selective connection to said gear on said spool support shaft.

2. The combination of claim 1 wherein said manually operated switch is a thumb switch which extends from said housing.

3. The combination of claim 1 wherein a battery charge cord extends from said housing for recharging said DC battery.

4. The combination of claim 1 wherein said housing has a selectively removable housing member to permit access to said interior compartment of said housing.

5. A hand-held device for powering the rewinding of a fishing line onto a spool of a fishing reel, comprising:
   a portable housing having an interior compartment;
   (a) a rechargeable DC battery positioned in said interior compartment of said housing;
   (b) a DC electric motor positioned in said interior compartment of said housing;
   (c) said DC electric motor being electrically connected to said battery;
   (d) said DC electric motor having a rotatable drive shaft extending therefrom which is rotatable in a single direction by said DC electric motor;
   (e) said housing including a manually operated switch which is electrically connected to said DC battery for controlling said DC electric motor; and
   said rotatable drive shaft of said DC electric motor being selectively removably connected to the spool of the fishing reel for rotating said spool to power rewind the fishing line onto the spool after the fishing line has been unwound from the spool, wherein the spool is mounted on a spool support shaft and wherein a gear is secured to said spool support shaft and wherein a gear is secured to said drive shaft of said DC electric motor and wherein said housing may be selectively removably positioned adjacent the fishing reel to selectively engage the gear on the spool support shaft with said gear on the DC electric motor drive shaft.

6. The hand-held device of claim 5 wherein said housing is comprised of first and second housing members which are selectively joined together.

7. The hand-held device of claim 6 wherein each of said first and second housing members have finger receiving indentations formed therein which are aligned when said first and second housing members are joined together.

8. The hand-held device of claim 6 wherein said first and second housing members are comprised of a transparent plastic material.

9. A hand-held device for powering the rewinding of a fishing line onto a spool of a fishing reel, comprising:
   a portable housing having an interior compartment;
   (f) a rechargeable DC battery positioned in said interior compartment of said housing;
   (g) a DC electric motor positioned in said interior compartment of said housing;
   (h) said DC electric motor being electrically connected to said battery;
   (i) said DC electric motor having a rotatable drive shaft extending therefrom which is rotatable in a single direction by said DC electric motor;
   (j) said housing including a manually operated switch which is electrically connected to said DC battery for controlling said DC electric motor; and
   said rotatable drive shaft of said DC electric motor being selectively removably connected to the spool of the fishing reel for rotating said spool to power rewind the fishing line onto the spool after the fishing line has been unwound from the spool, wherein each of said first and second housing members have finger receiving indentations formed therein which are aligned when said first and second housing members are joined together.

* * * * *